United States Patent
Masten et al.

(12)
(10) Patent No.: US 6,365,048 B1
(45) Date of Patent: Apr. 2, 2002

(54) METHOD FOR TREATMENT OF ORGANIC MATTER CONTAMINATED DRINKING WATER

(75) Inventors: Susan Jane Masten, East Lansing; Alexander A. Yavich, Grand Rapids, both of MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 0 days.

(21) Appl. No.: 09/619,542

(22) Filed: Jul. 19, 2000

(51) Int. Cl.[7] .................................. C02F 3/08; C02F 1/78
(52) U.S. Cl. ...................... 210/610; 210/617; 210/621; 210/629; 210/631; 210/760
(58) Field of Search ................................ 210/610, 611, 210/617, 616, 620, 621, 629, 631, 760, 792, 793, 794, 795, 903, 908

(56) References Cited

U.S. PATENT DOCUMENTS

| | | | |
|---|---|---|---|
| 3,356,609 A | * | 12/1967 | Bruemmer |
| 3,779,909 A | | 12/1973 | Wisfeld |
| 3,836,456 A | | 9/1974 | Fries |
| 4,178,239 A | | 12/1979 | Lowther |
| 4,255,266 A | | 3/1981 | Moreaud et al. |
| 4,620,931 A | * | 11/1986 | Hirata et al. |
| 4,693,827 A | | 9/1987 | Mordorksi |
| 4,696,747 A | * | 9/1987 | Verstraete et al. |
| 5,211,847 A | | 5/1993 | Kanow |
| 5,336,413 A | | 8/1994 | van Staveren |
| 5,346,617 A | | 9/1994 | Costello |
| 5,466,373 A | * | 11/1995 | Handwerker et al. |
| 5,466,374 A | | 11/1995 | Bachhofer et al. |
| 5,505,856 A | | 4/1996 | Campen et al. |
| 5,512,178 A | | 4/1996 | Dempo |
| 5,552,052 A | * | 9/1996 | Mazewski et al. |
| 5,580,458 A | * | 12/1996 | Yamasaki et al. |
| 5,653,883 A | * | 8/1997 | Newman et al. |
| 5,711,887 A | | 1/1998 | Gastman et al. |
| 5,851,399 A | | 12/1998 | Leitzke |
| 5,885,826 A | | 3/1999 | Worden et al. |
| 5,942,118 A | | 8/1999 | Besten |
| 5,954,963 A | | 9/1999 | Matheson |
| 6,093,321 A | * | 7/2000 | Bonnelye et al. |

* cited by examiner

*Primary Examiner*—David A. Simmons
*Assistant Examiner*—Fred Prince
(74) *Attorney, Agent, or Firm*—Ian C. McLeod

(57) ABSTRACT

A process for treating water to reduce pollutants using a fluidized bed (41) supporting microorganisms, ozonated pollutants and a carbon source for the microorganisms is described. The process provides very efficient degradation of the pollutants in drinking water, for instance.

24 Claims, 12 Drawing Sheets

METHOD FOR TREATMENT OF ORGANIC MATTER CONTAMINATED DRINKING WATER

STATEMENT REGARDING FEDERALLY FUNDED RESEARCH AND DEVELOPMENT

This invention was sponsored by National Science Foundation Grant No. BES-9632232 and the Environmental Protection Agency Grant No. R826829-01-0. The Government has certain rights in this invention.

CROSS-REFERENCE TO RELATED APPLICATIONS

None

BACKGROUND OF THE INVENTION (1). Field of the Invention

The present invention relates to a process which enables the treatment of organic matter contaminated drinking water. In particular, the present invention uses a combination of the addition of a carbon source to a fluidized bed bioreactor and ozonated organic matter to biodegrade the ozonated organic matter and carbon source and thus purify the water.

(2). Description of Related Art

The use of beds containing microorganisms in an aerobic biological environment which degrades pollutant organic matter in water is well known in the prior art. Further, the use of ozone to oxidize the organic matter for biodegradation is well known in the prior art. U.S. Pat. No. 5,851,399 to Leitzke describes such a process using a fixed bed reaction vessel. U.S. Pat. No. 3,779,909 to Wisfeld et al also describes a similar fixed bed process. Various other patents are as follows: U.S. Pat. No. 5,954,963 to Matheson; U.S. Pat. No. 5,942,118 to Besten; U.S. Pat. No. 5,885,826 to Worden et al; U.S. Pat. No. 5,711,887 to Gastman et al; U.S. Pat. No. 5,512,178 to Dempo; U.S. Pat. No. 5,505,856 to Campen et al; U.S. Pat. No. 5,466,374 to Bachhofer et al; U.S. Pat. No. 5,346,617 to Costello; U.S. Pat. No. 5,336,413 to van Staveren; U.S. Pat. No. 5,211,847 to Kanow; U.S. Pat. No. 4,693,827 to Mordorski U.S. Pat. No. 4,255,266 to Moreaud et al; U.S. Pat. No. 4,178,239 to Lowther; and U.S. Pat. No. 3,836,456 to Fries.

U.S. Pat. No. 4,693,827 Mordoski describes a fixed bed method for accelerating the start-up of biological nitrification systems for wastewater treatment and preventing reducing the effects of toxic and inhibitory materials or excursions of pH, temperature, or dissolved oxygen upon nitrifying organisms. A rapidly metabolized soluble or miscible organic material containing little or no nitrogen is added to the carbon-consuming step of the process. Heterotrophic organisms consume the added material together with soluble ammonia to generate additional organisms. The soluble ammonia concentration in the wastewater is reduced to a nontoxic, less toxic, or less inhibitory level. The goal is to increase the removal of ammonia nitrogen from wastewater by adding rapidly metabolized carbon source. The carbon source provides growth of heterotrophic microorganisms that consume ammonia nitrogen which is incorporated into cellular matter (the C:H:O:N ratio of bacterial cells is typically about 52:6:26:12). This reference describes the use of additional rapidly metabolized carbon source to increase biomass concentration; the use of chemical compounds such as carbon supplements (alcohols, organic acids, and the like) for the degradation; and that the carbon source is added to the water stream just prior to or directly to the stage which removes carbonaceous materials from water. The patented method pertains to the removal of ammonia nitrogen, but not to the removal of organic matter initially present in water.

U.S. Pat. No. 5,954,963 to Matheson describes a fixed bed process and apparatus for biologically treating water without using ozone. The inventive process preferably comprises the steps of: (a) adding a sulfur-containing oxygen scavenger to the water in an amount effective for at least reducing the amount of dissolved free oxygen in the water; (b) removing at least a portion of a substance from the water by exposing the water to microorganisms effective for biologically removing the substance therefrom; and (c) feeding a biostimulant to the microorganisms effective for increasing the rate at which step (b) occurs. The inventive apparatus preferably comprises a system for adding the sulfur-containing oxygen scavenger to the source water stream and a system for feeding the biostimulant to the microorganisms. The invention particularly relates to processes and apparatuses for the biological denitrification of water.

The patent describes the use of a biostimulant to the microorganisms to increase the rate at which a substance is removed from water; the use of low molecular weight organic compounds as carbon supplements for the purpose of invention (alcohols, organic acids, and the like); and the use of a carbon source added to the water stream at a point located at a very short distance upstream of the bioreactor.

The process of Matheson pertains to biological denitrification of water, and not the removal of organic matter present in water. The Matheson process is not capable of effectively removing organic matter (particularly humic substances, which are disinfection by-product precursors) from water. This is because most of the organic matter present in water cannot be effectively degraded by purely biological means. As a result, while microorganisms consume the biostimulant, little or no removal of organic matter present in water occurs. No ozonation is used first to convert nonbiodegradable organic materials into biodegradable organic matter and then "stimulated" biodegradation is used to increase the rate at which this biodegradable organic matter is removed by microorganisms. In Matheson, the carbon source (an organic compound) may be added.

U.S. Pat. No. 5,851,399 to Leitzke describes a fixed bed process which serves for treating water polluted with pollutants which can only be degraded with difficulty by purely biological means. The water is circulated through a reactor vessel arrangement in which it is treated with ozone which causes a preliminary oxidation of the pollutants. The water passes into a vessel arrangement containing an aerobic biological treatment which, owing to the preliminary oxidation of the pollutants, is able to degrade these further. It can be inferred from the description, that water alternately passes through ozonation and biodegradation stages so that ozone is used to break down nonbiodegradable materials and convert them into biodegradable materials, which are removed at the biodegradation stage.

Leitzke describes the use of recirculation through ozonation and biodegradation stages. The Leitzke process was not effective for either the removal of natural organic matter present in water or producing biologically stable water. This is because ozonation of natural organic matter produces a significant amount of slowly biodegradable organic matter, which is difficult to remove by biodegradation. There is no disclosure of a rapidly metabolized carbon source which increases the rate at which these biodegradable materials are biodegraded, thus, significantly enhancing the effect of recirculation on process efficiency.

U.S. Pat. No. 5,466,374 to Bachhofer et al and Locher describes a fixed bed process for purifying polluted water containing organic nutrients for microorganisms, the process including (a) mixing the organically polluted water intensively with ozone in an ozone treatment unit; (b) adding to the water of step (a) at least one compound containing sulfur, which at least one compound containing sulfur is bioavailable for assimilation by at least aerobic microorganisms; and (c) passing water of step (b) through a filter composed of a plurality of layers. The process may optionally include treating water after step (c) with ozone in an ozone water treatment unit in order to oxidize residual bioavailable sulfur. The compound containing sulfur is preferably added in an amount which is effective to at least eliminate sulfur deficiency of the aerobic microorganisms and promote growth of a biofilm in the filter thereby contributing to biological mineralization of the organic nutrients. The goal is to increase the bioavailability of organic pollutants by means of ozone and to increase the rate of biodegradation by adding sulfur containing compounds that promotes growth of biomass.

Bachhofer et al describe the use of ozone to convert nonbiodegradable materials into biodegradable organic matter; the use of biodegradation to remove biodegradable organic matter; and the addition of biostimulants to increase biodegradation rate by promoting growth of biomass.

The Bachhofer et al process implies that the growth of biomass is limited by the deficiency of sulfur in water. Therefore, adding a sulfur compound to water is a key element of this invention. They do not suggest that a source of carbon is a limiting factor.

U.S. Pat. No. 4,178,239 to Lowther describes a fixed bed process for intermediate treatment of aqueous sewage containing biodegradable materials and non-biodegradable materials. The sewage is contacted with an ozone-containing gas to pretreat the sewage by converting a substantial amount of the non-biodegradable material, followed by a conventional secondary treatment with an $O_2$-containing gas such as air in the presence of aerobic or facultative anaerobic microorganisms. The process of combined ozonation and biodegradation is widely used in water treatment practice. Ozone is used to convert nonbiodegradable organic mater into biodegradable organic materials, which are degraded through the action of microorganisms. There is no use of a carbon source stimulant.

U.S. Pat. No. 5,211,847 to Kanow describes a denitrification method. U.S. Pat. No. 4,693,827 to Mordoski describes a similar process. U.S. Pat. No. 5,336,413 to van Staveren describes a fixed or fluidized bed process and apparatus for the purification of water, oxygen/ozone-gas mixture is introduced under high pressure in the water to be purified, and thus obtained oxygen/ozone-gas mixture enriched water is passed to a purification stage which comprises at least one reactor. Insufficiently degraded contaminants are retained by a membrane filter unit and recycled to the purification stage. Thus contaminants, such as hydrocarbon compounds and the like, are recirculated until they are converted to carbon dioxide and water. This reference is similar to Leitzke, except for membrane separation. There is no carbon source.

Fluidized beds are well known in the prior art. They are not used widely in the treatment of drinking water to remove pollutants. Most prior art reactors are fixed beds. The problem is that such beds tend to produce irregular treatment along the length of the fixed bed and are subject to clogging. There is a need for improvement.

The presence of naturally occurring organic matter (NOM) in drinking water is problematic due to the formation of trihalomethanes (THMs) and other halogenated compounds during disinfection with chlorine. Many of these disinfection by-products (DBPs) of chlorination of NOM are either carcinogenic or potentially carcinogenic, and, as such, their presence in drinking water is being increasingly regulated by U.S. Environmental Protection Agency. As a result, cost-effective treatment systems which are capable of reducing the formation of DBPs must be developed.

Most conventional ozonation/biodegradation treatment processes (e.g. the Mülheim process, the Metropolitan Water District process, the Andover process, and the EBMUD process) are sequential processes in which ozone is applied prior to biofiltration. This means that a portion of ozone is consumed by some organic compounds (original organics or ozonation by-products) that could have otherwise been degraded biologically.

To prevent biofilters from clogging, most conventional ozonation/biodegradation treatment processes require additional pretreatment, such as coagulation/flocculation/sedimentation (e.g., the Metropolitan Water District process, the Andover process, and the EBMUD process) or powdered-activated-carbon treatment (e.g., the Mülheim process), which are used either before ozonation (e.g., the Mülheim process, the Metropolitan Water District process, and the EBMUD process) or between ozonation and biofiltration steps (e.g., the Andover process). This prevents clogging of the bed containing the microorganisms.

Prior art systems are poorly controlled and must be custom-designed for each specific application. Standard-size units that have small footprint and in many cases can be skid-mounted would be desirable. The process performance of the unit could be optimized for different sources of water supplies. The system should also be capable of meeting future effluent standards through process parameter optimization without plant expansion or process modification. The system is preferably monitored and controlled from remote locations using advanced telemetry, thus reducing operating and maintenance costs.

SUMMARY OF THE INVENTION

The present invention relates to a process for the treatment of water to reduce amounts of pollutants in the water which comprises:
(a) directing the water containing the pollutants, which pollutants are ozonated, through a microbiologically active fluidized bed of particles in a vessel with an inlet and an outlet for the water so that the bed is fluidized by the water and the pollutants are degraded by microorganisms in the bed;
(b) providing a carbon source for the microorganisms in the fluidized bed in the vessel as the water is moved through the fluidized bed in the vessel, wherein the carbon source and pollutants are co-metabolized by the microorganisms and a effluent is removed from the outlet from the vessel; and
(c) filtering the effluent from the vessel, wherein the water with the reduced amounts of the pollutants is produced.

The term "water" as used herein means aqueous liquids which can contain small portions of other liquids which do not interfere with the processing. Usually the amounts are between about 1 mg and 50 mg per liter.

The term "pollutant" or "pollutants" means carbon compounds and nitrogen compounds or combinations thereof.

The term "microbiologically active" means containing microorganisms, usually bacteria which function in an aerobic environment. Such bacteria are for instance Pseudomonas, Bacillus, and other oil bacteria. Typically the microorganisms are produced naturally in the bed, but can be added as supplied from commercial sources.

The term "bed" means a solid surface of particles to which the microorganisms adhere. Such beds preferably are particles of an inorganic process, water insoluble material preferably having an average particle size of about 8 and 30 mesh (standard US). Sand or activated carbon can be used.

The term "fluidized" means that the particles in the bed are suspended by the motion of the water through the bed. The temperatures of the water in the bed are between about 1 and 45° C.

The abbreviation "DBP" means disinfection by-products from ozonation and chemical water treatment.

The abbreviation NOM means naturally occurring organic matter in water.

The abbreviation "THM" means trihalomethanes (chloroform, bromodichloromethane, dibromochloromethane, and bromoform) produced from disinfection of water with chlorine.

The "carbon source" is preferably water soluble and is preferably an easily biodegradable compound such as lower alkyl alkanols, acids and salts containing 1 to 6 carbon atoms.

The inventive process preferably comprises the steps of: (a) treating water to break down organic matter with ozone in the amount effective for converting all or some nonbiodegradable organic matter present in water into biodegradable materials; (b) treating water from step (a) in a biologically active fluidized bed system in order to remove biodegradable organic matter; and (c) adding a biostimulant at step (b) in order to increase biodegradation efficiency of step (b). The process may optionally include recycling a portion of the water from step (b) back to step (a) in order to further convert remaining nonbiodegradable organic matter into biodegradable materials. The inventive process may alternately comprise the steps of: (a) treating water in a biological fluidized bed treatment system in order to remove some organic matter present in water; (b) adding a biostimulant at step (a) in order to increase biodegradation efficiency of step (b); (c) treating the water after step (a) with ozone in order to convert nonbiodegradable organic matter into biodegradable material; and (d) biologically treating the water after step (c) in order to remove biodegradable organic matter produced after step (c). The alternative process may optionally include recycling a portion of the water after step (c) back to step (a) in order to increase the efficiency of the removal of biodegradable organic matter produced after step (c).

OBJECTS

It is therefore an object of the present invention to provide a process for the treatment of water to remove pollutants. Further, it is an object of the present invention to provide a process which can be easily scaled to any volume of water purification, particularly drinking water. Further still, it is an object of the present invention to provide a process which is relatively economical to perform with commercially available equipment components. These and other objects will become increasingly apparent by reference to the following description and the drawings.

DESCRIPTION OF PREFERRED EMBODIMENTS

Figure 1:
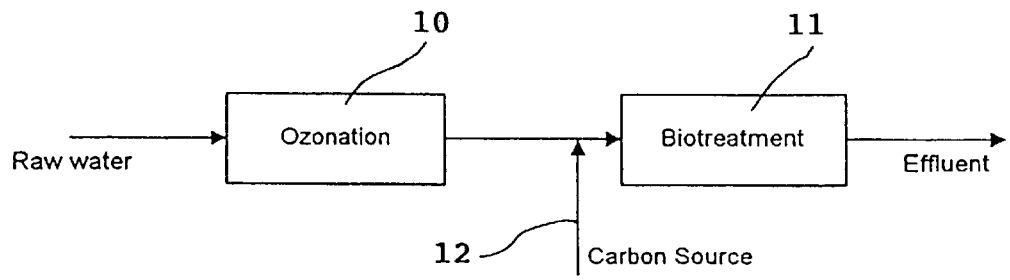
FIG. 1 is a schematic view of the process of the present invention.

In one embodiment shown in FIG. 1, the process comprises the steps of: (a) treating water with ozone in a vessel 10 in the amount effective for converting all or some nonbiodegradable organic matter present in water into biodegradable materials; (b) treating water from step (a) in a microbiologically active fluidized bed system in vessel 11 in order to remove biodegradable organic matter; and (c) adding a biostimulant through line 12 at step (b) in order to increase biodegradation efficiency of step (b).

Figure 2:
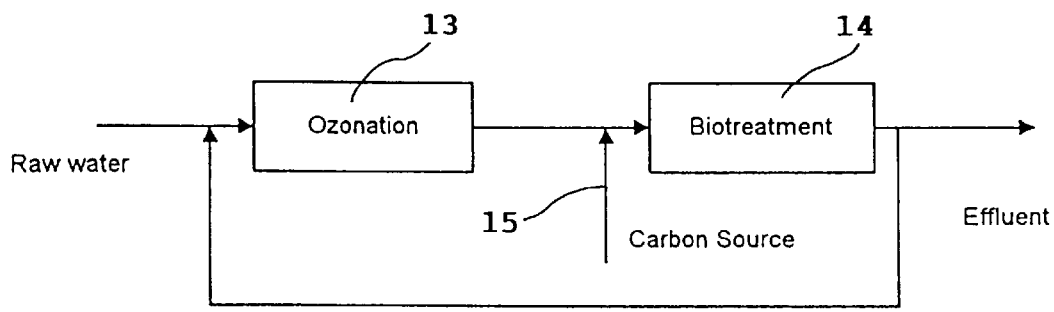
FIGS. 2 to 5 are schematic views of other embodiments of the present invention.

Another embodiment shown in FIG. 2, the process 2 comprises the steps of: (a) treating water with ozone in vessel 13 in the amount effective for converting some or all nonbiodegradable organic matter present in water into biodegradable materials; (b) treating water from step (a) in a biologically active fluidized bed system in vessel 14 in order to remove biodegradable organic matter; (c) adding a biostimulant through line 15 at step (b) in order to increase biodegradation efficiency of step (b); and (d) recycling a portion of the water after step (b) back to step (a) in order to further convert remaining nonbiodegradable organic matter into biodegradable materials.

Figure 3:
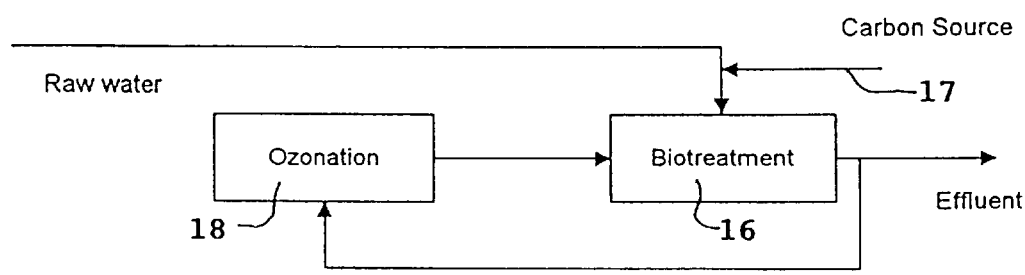
Figure 4:
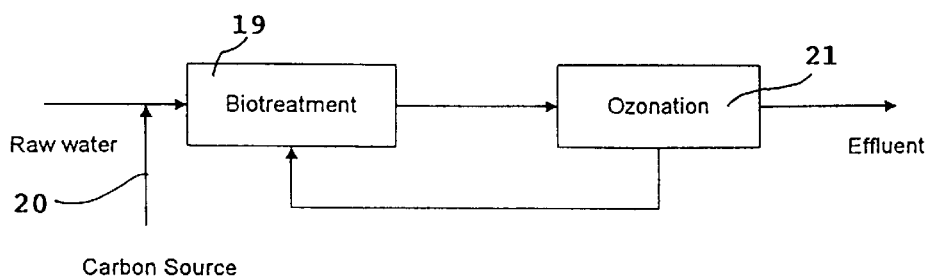

In embodiments shown in FIGS. 3 and 4, the inventive process comprises the steps of: (a) treating water in a biological fluidized bed treatment system in vessel 16 or 19 in order to remove some organic matter present in water; (b) adding a biostimulant through line 17 or 20 at step (a) in order to increase biodegradation efficiency of step (b); (c) treating the water after step (a) with ozone in vessel 18 or 21 in order to convert nonbiodegradable organic matter into biodegradable material; and (d) biologically treating the water in vessel 16 or 19 after step (c) in order to remove biodegradable organic matter produced after step (c).

Figure 5:
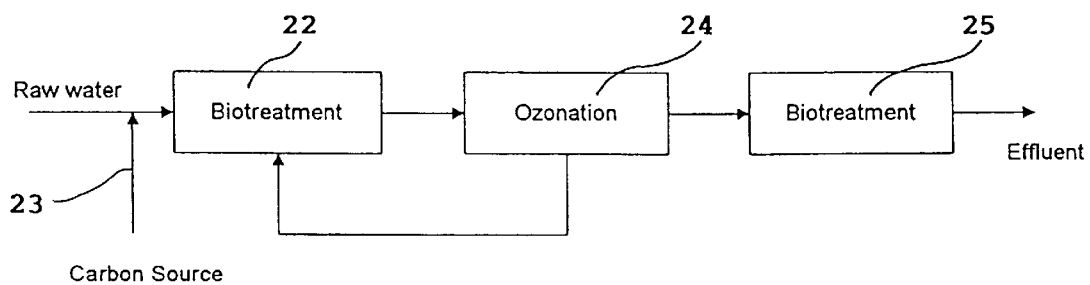
Figure 6:
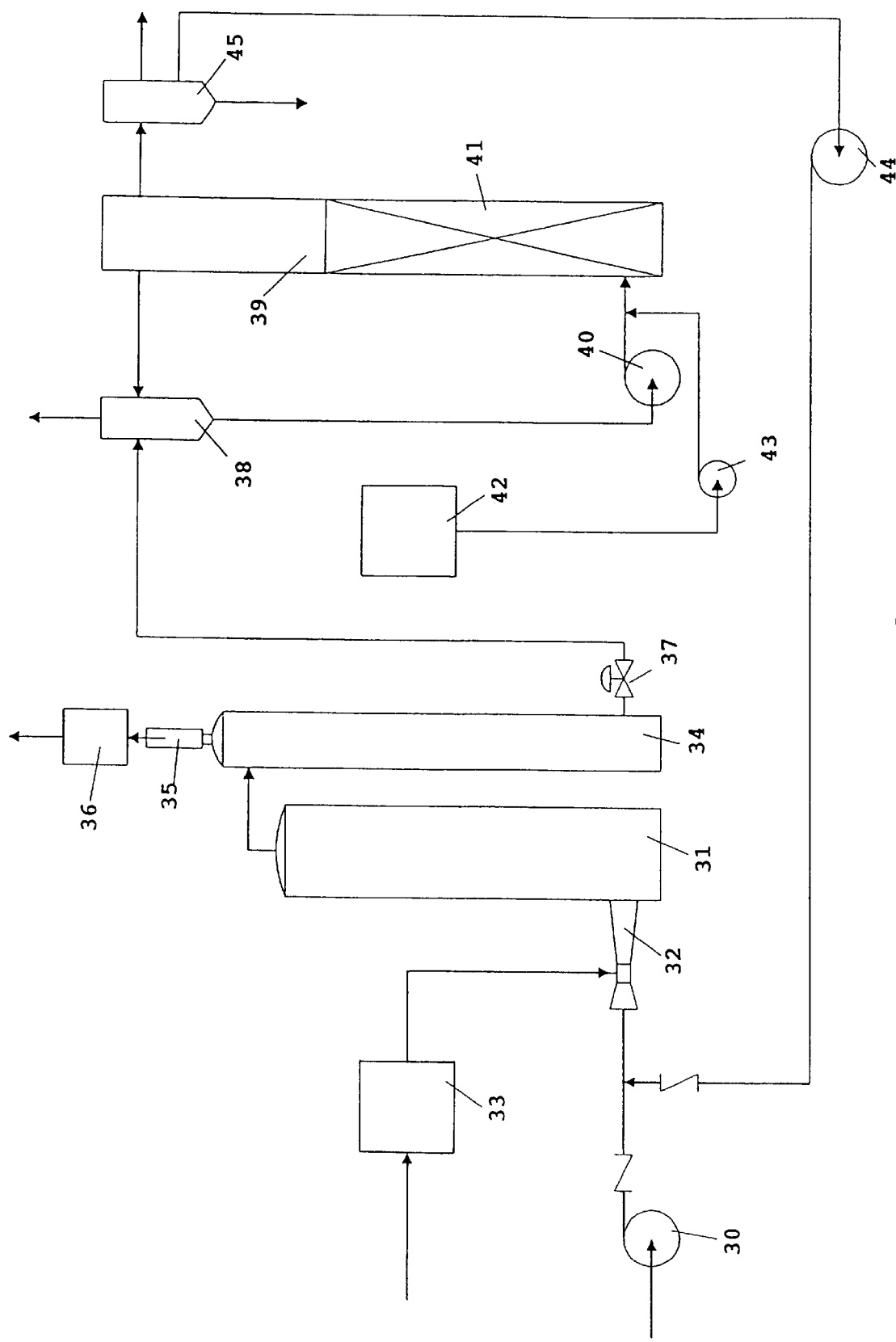
FIG. 6 is a schematic view of the equipment used in the present invention.

In other embodiments shown in FIGS. 5 and 6, the inventive process comprises the steps of: (a) treating water in a biological fluidized bed treatment system in vessel 22 in order to remove some organic matter present in water; (b) adding a biostimulant through line 23 at step (a) in order to increase biodegradation efficiency of step (b); (c) treating the water after step (a) with ozone in vessel 24 in order to convert nonbiodegradable organic matter into biodegradable material; (d) biologically treating in vessel 25 the water after step (c) in order to remove biodegradable organic matter produced after step (c); and (e) optionally recycling a portion of the water after step (c) back to step (a) in order to increase the efficiency of the removal of biodegradable organic matter produced after step (c).

EXAMPLE 1

The preferred embodiment of FIGS. 1 and 2 of the inventive process is depicted in FIG. 6.

Water is pumped by a feed pump 30 into an ozone reaction vessel 31 through an in-line ozone-water mixing system 32. In the in-line ozone-water mixing system water is mixed with ozone which is produced in an ozone generator 33 from plant air or oxygen.

The reaction vessel 31 provides detection time for the ozone to react with organic matter in water. The water then flows to the degas separator 34 in which gas bubbles are separated from water. The degas separator 34 also provides additional mixing and detection time. The gas is released through pressure relieve valve 35 into an ozone destruction system 36, in which the residual ozone is destroyed by conventional means and vented (see arrow). The pressure in the reaction vessel 31 and degas'separator 34 is controlled by a back pressure control valve 37 installed downstream of the degas separator 34.

From the degas separator 34 the water flows into a vessel 38 from where the water is recirculated through a bioreactor 39 by a recirculating pump 40 at a rate sufficient to fluidize a bed of particles 41 which serve as support media for microorganisms. The vessel 38 also is used for releasing of the remaining or newly formed gas bubbles when the water is exposed to atmospheric pressure.

The biostimulant (carbon compound) is injected by pump 43 from a biostimulant feed tank 42 preferably into the discharge line of pump 40 preferably located near bioreactor 39. The microorganisms attached to the bed particles near the bottom 41 of bioreactor 39 are exposed to highest concentration of easily biodegradable carbon and, hence, tend to grow fast, forming a thick layer of biofilm around particles. These particles with the thickest layer of biofilm are lighter than the ones in the upper layer and, hence, tend to migrate towards the top of the bed, i.e. to the area with deficiency of easily degradable carbon source. Once deprived of easily biodegradable carbon source, microorganisms tend to consume organic matter, which under normal circumstances is not a preferred carbon source. Thus, the biostimulant and easily biodegradable organic matter formed after ozonation are mineralized in a lower part of bioreactor 39, while not easily biodegradable organic matter is mineralized in the upper part of bioreactor 39.

The biotreated water then flows to tank 45 and then flows as shown by the arrow to further necessary treatment (e.g., rapid filtration to remove remaining turbidity, disinfection, fluoridation, and the like).

In a second embodiment of FIG. 6, there is pumping by pump 44 of a portion of the treated water from tank 45 back to the ozonation system. In this way, some nonbiodegradable organic matter is recycled to be for further treated with ozone.

EXAMPLE 2

Figure 7:
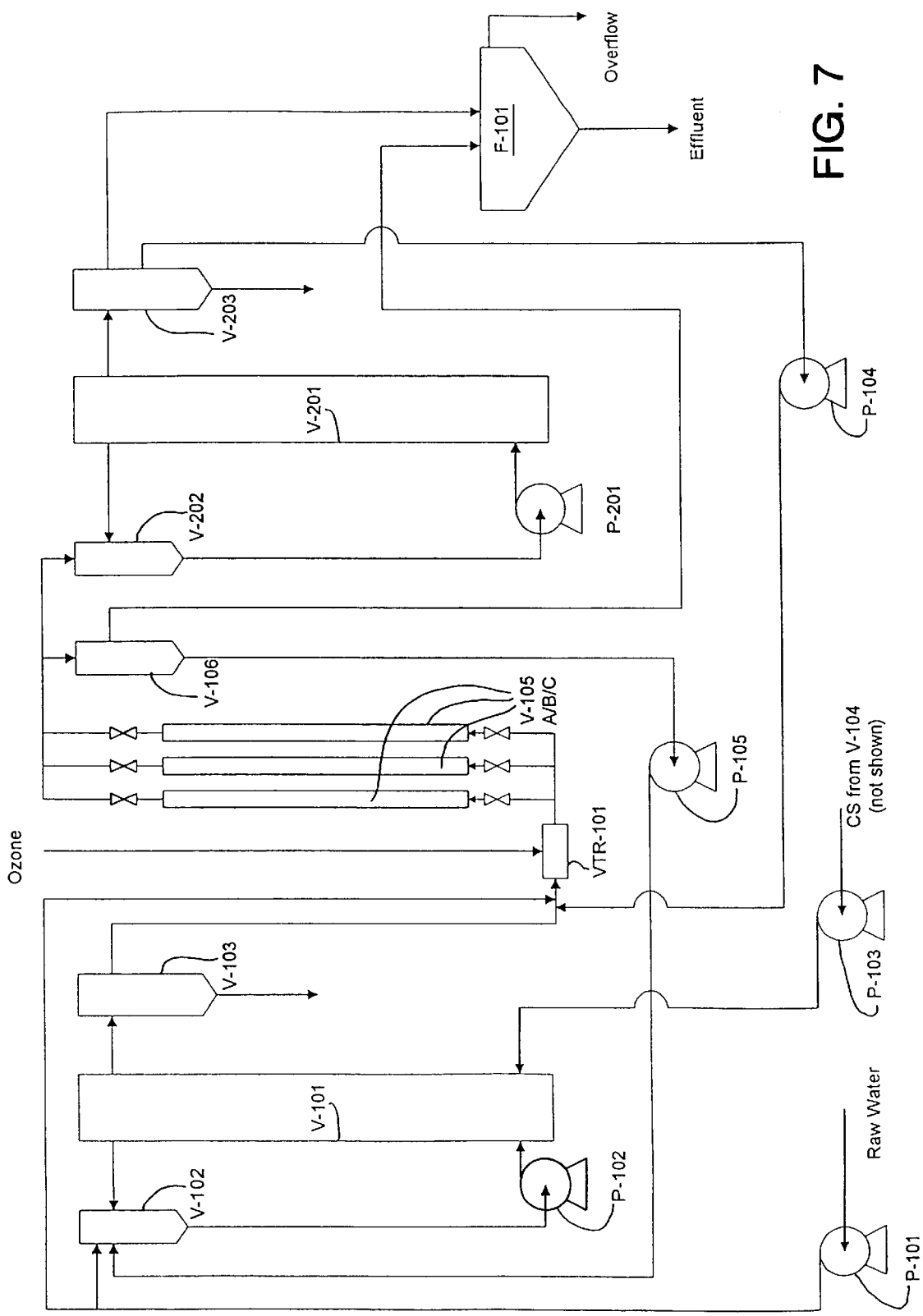
FIGS. 7 to 10 are schematic views of the equipment showing variations in the use of the apparatus of FIG. 6 in bold lines.

The ozonation/FBT system is designed to evaluate the performance of the combined ozonation and biological fluidized bed treatment (FBT) for the control of disinfection by-products precursors in drinking water. The system of FIG. 7 consists of a raw water pump, an ozonation skid-mounted system, two interchangeable skid-mounted systems (for the purpose of simplicity, interchangeability is not reflected in FIG. 7) and a rapid sand filtration skid-mounted system. The major goal of the ozonation step is to convert nonbiodegradable natural organic matter (NOM) into biodegradable materials. Biodegradable organic matter is removed by biological activity in the FBT column(s). In the FBT column(s) water flows upward at a rate sufficient to fluidize the bed of particles with attached microorganisms. High specific flow rate can be achieved without introducing the problem of clogging. Rapid sand filtration is installed downstream of the FBT and ozonation systems and is used as a polishing stage of the process for the removal of remaining turbidity and/or remaining biodegradable organic matter. The design capacity of the system described is 1 gpm but can be made any size.

Figure 8:
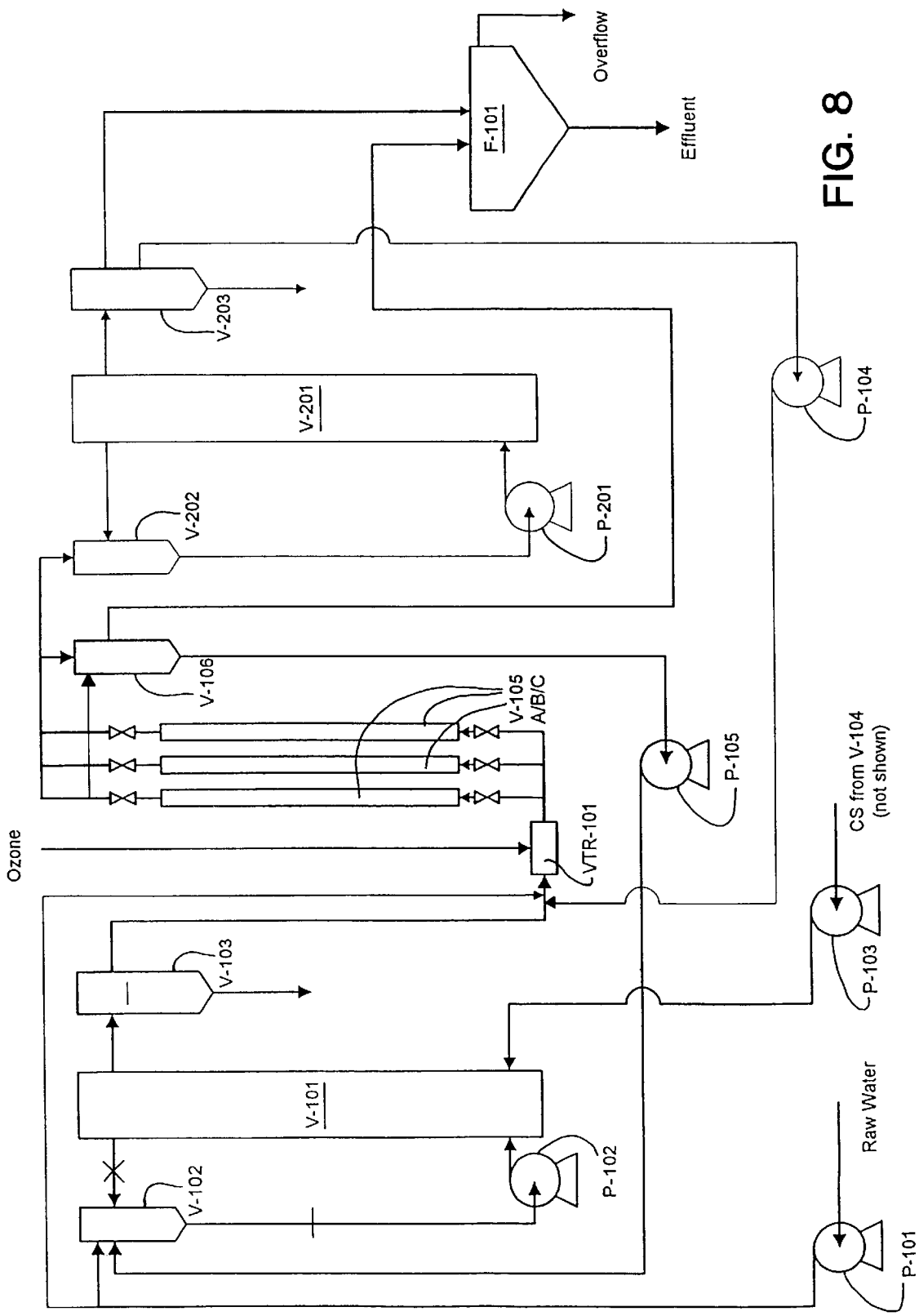

The system is designed to accommodate the following modes of operation, which are discussed in the following subsections:
(1) Single-pass FBT/ozonation mode;
(2) FBT/ozonation mode with recycle;
(3) Single-pass ozonation/FBT mode;
(4) Ozonation/FBT mode with recycle; and
(5) Single-pass FBT/ozonation/FBT mode. FBT/Ozonation Mode The process flow diagram for the FBT/ozonation mode of operation is shown in FIG. 8. The equipment and process lines used in this mode of operation are shown in bold. Raw water is pumped by the Raw Water Pump P-101 into the FBT Equalization Tank V-102 from where it is recirculated through the FBT column V-101 at a rate sufficient to fluidize the bed.

The effluent from V-101 flows to the FBT Effluent Tank V-103 from where it flows by gravity through the Venturi Injector VTR-101 and the Reaction Columns V-105 A/B/C into the Equalization Tank V-106. Ozone from the ozone generator (not shown) is injected into the Venturi Injector VTR-101, which provides mixing of ozone with water stream. The Reaction Columns V-105 A/B/C are columns of different diameter which provide various contact times for the dissolved ozone to react with NOM.

Water from the Equalization Tank V-106 flows by gravity through the Sand Filter F-101, which is used as a final polishing stage of the process to remove remaining turbidity and/or biodegradable organic matter formed during ozonation. The water from V-106 can also be recycled back to the FBT column using the Recycle Pump P-105. In this way, biodegradable organic matter formed during ozonation is biodegraded in the FBT column V-101. An additional carbon source (CS) is injected by the CS Pump P-103 from the CS storage tank V-104 (Not shown) to the FBT Column V-101 or at the discharge of the FBT Recirculating Pump P-102. The use of an additional carbon source increases the biodegradation efficiency of the FBT column.

Ozonation/FBT Mode

Figure 9:
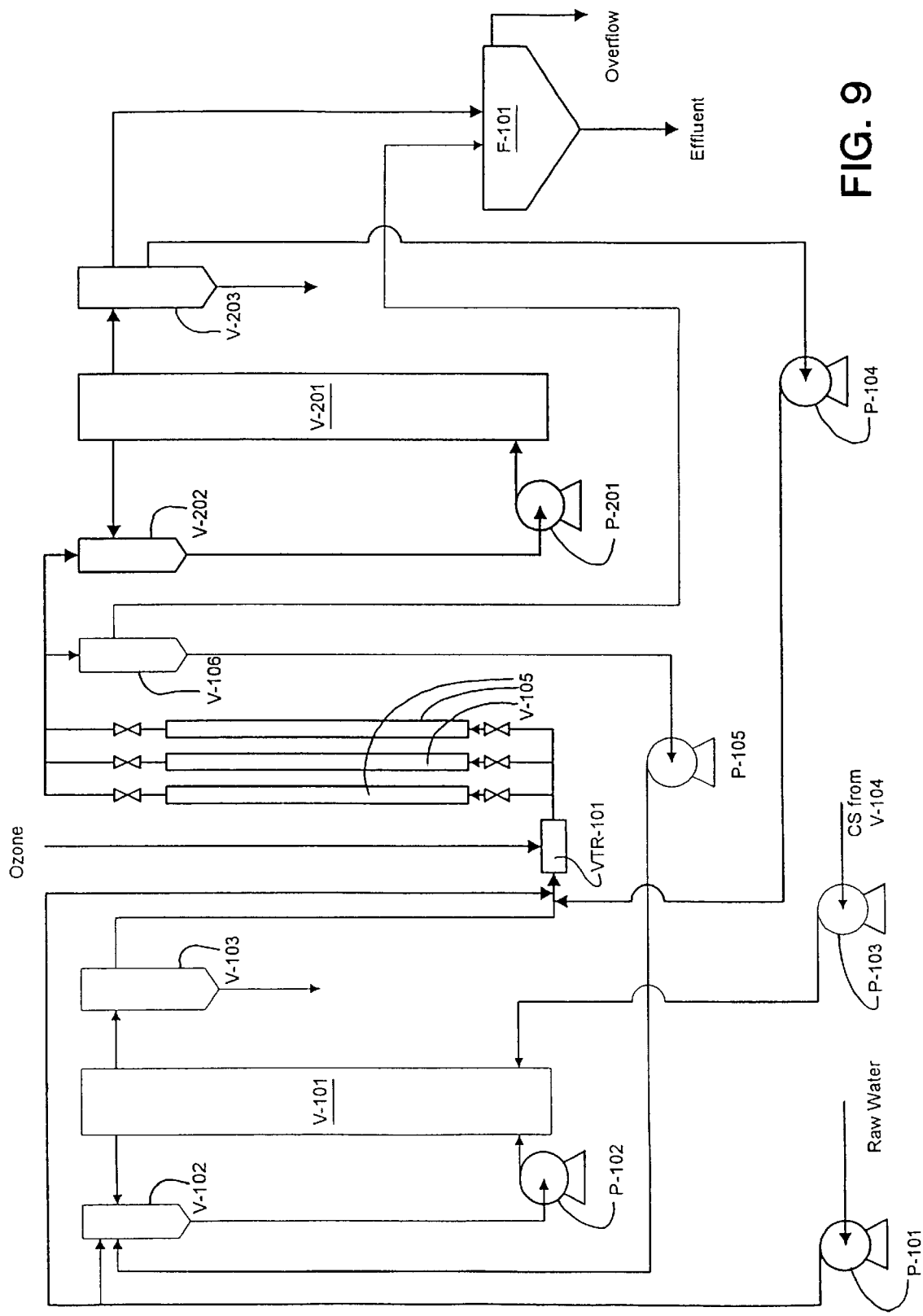

The process flow diagram for the FBT/Ozonation mode of operation is shown in FIG. 9. The equipment and process lines used in this mode of operation are shown in bold. Raw water is pumped by the Raw Water pump P-101 through the Venturi Injector VTR-101 and the Reaction Columns V-105 A/B/C into the FBT Recirculating Tank V-202, from where it is recirculated through the FBT column V-201 at a rate sufficient to fluidize the bed. Ozone from the ozone generator (not shown) is injected into the Venturi Injector VTR-101, which provides mixing of ozone with water stream. The Reaction Columns V-105 A/B/C provide contact time for the dissolved ozone to react with NOM.

The effluent from V-201 flows to the FBT Effluent Tank V-203 from where it flows by gravity through the Sand Filter F-101, which is used as a final polishing stage of the process to remove remaining turbidity and/or remaining biodegradable organic matter.

The water from V-203 can also be recycled back to the ozonation system using the Recycle pump P-104. In this way, non-biodegradable organic matter remaining after fluidized bed treatment is ozonated again to form additional biodegradable materials. An additional carbon source (CS) can also be injected into V-201 (FIG. 7) in order to increase FBT efficiency.

FBT/Ozonation/FBT Mode

Figure 10:
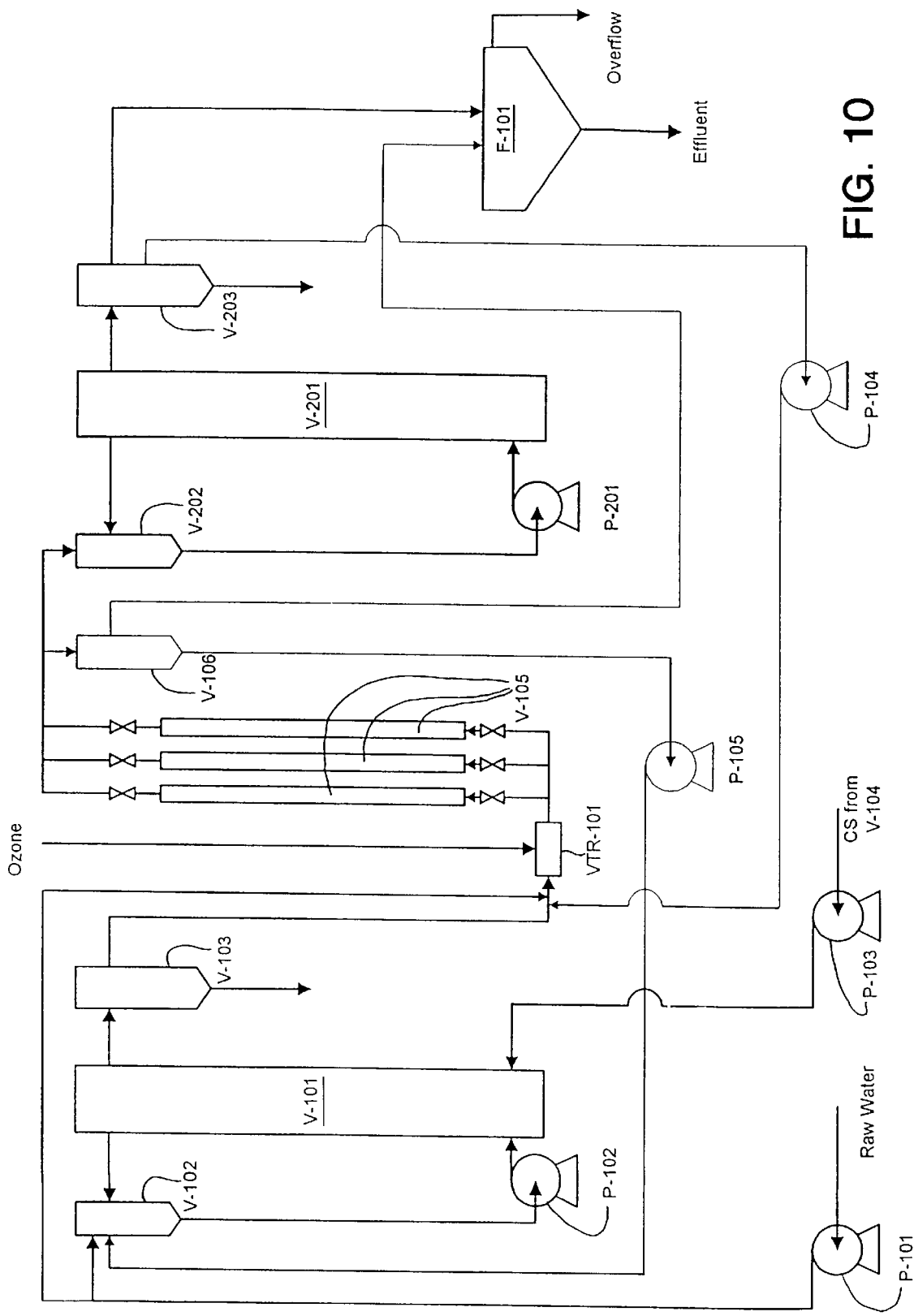

The process flow diagram for the FBT/ozonation mode of operation is shown in FIG. 10. The equipment and process lines used in this mode of operation are shown in bold. Raw water is pumped by the Raw Water Pump P-101 into the FBT Equalization Tank V-102 from where it is recirculated through the FBT column V-101 at a rate sufficient to fluidize the bed.

The effluent from V-101 flows to the FBT Effluent Tank V-103 from where it flows by gravity through the Venturi Injector VTR-101 and the Reaction Columns V-105 A/B/C into the FBT Equalization Tank V-202, from where it is recirculated through the FBT Column V-201. Ozone from the ozone generator (not shown) is injected into the Venturi Injector (VTR-101), which provides mixing of ozone with water stream. The Reaction Columns V-105 A/B/C provide contact time for th dissolved ozone to react with NOM.

The effluent from V-201 flows to the FBT Effluent Tank V-203 from where it flows by gravity through the Sand Filter F-101, which is used as a final polishing stage of the process to remove remaining turbidity and/or remaining biodegradable organic matter.

The operation of the pilot ozonation/FBT system has been described. The following is a more detailed description of specific equipment and operating parameters is presented.

The system is designed to treat 1 gpm of water. For ease of operation and interchangeability practicalities, the system consists of five skid-mounted packages, as follows:

(1) Raw Water Pumping skid-mounted system;
(2) Two FBT skid-mounted systems;
(3) Ozonation skid-mounted system; and
(4) Sand Filtration skid-mounted system.

Two FBT skid-mounted systems, complete with FBT columns, equalization tanks, recirculation pumps, and additional carbon source (CS) injection systems, can be used either interchangeably (when only one of the system is employed) or in sequence (one of the system before and the other after the ozonation stage). All equipment and instrumentation in the first FBT system have tag numbers starting with 1, and all equipment and instrumentation in the second system have tag numbers starting with 2.

Raw Water Pumping System.

Figure 11:
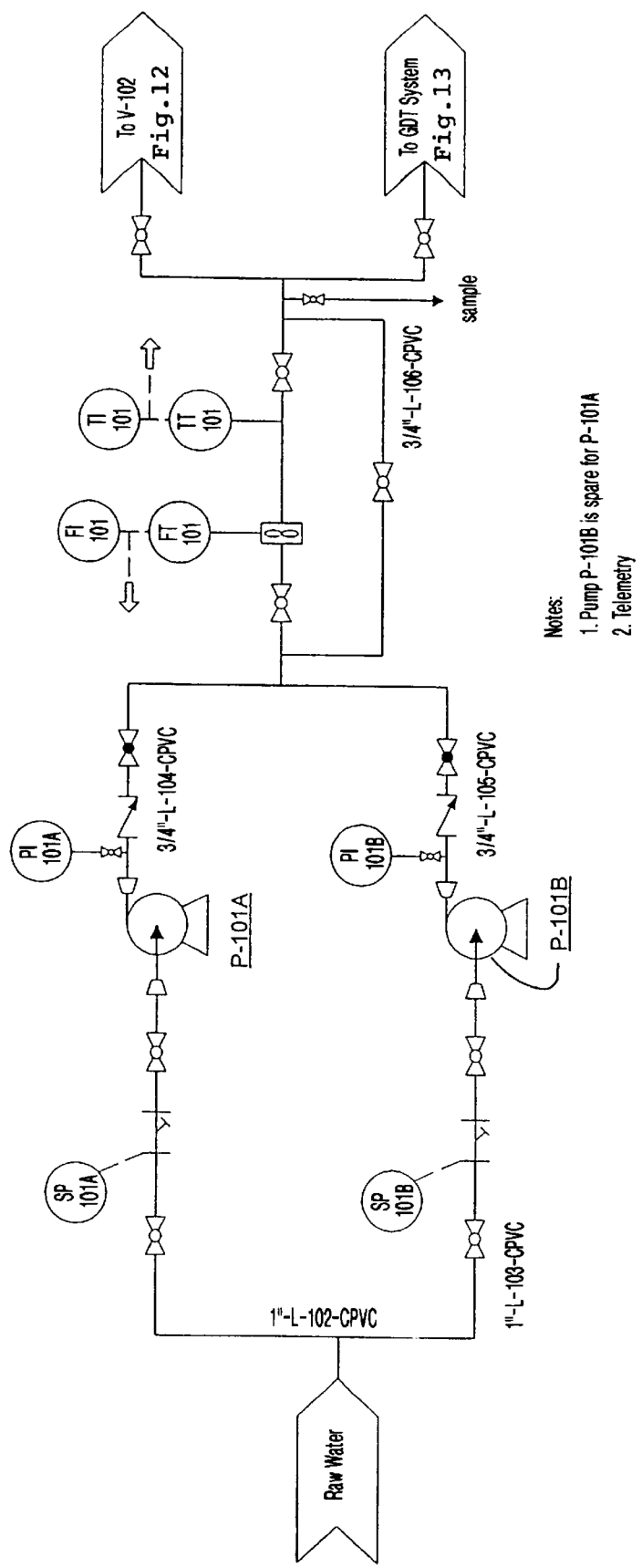
FIGS. 11 to 15 are detailed schematic views of the equipment and apparatus of the present invention.

Referring to FIG. 11, raw water from the plant source is pumped by either Raw Water Pump P-101A or P-101B to the FBT Equalization Tank V-102 of the first FBT system, or the FBT Equalization Tank V-202 of the second FBT system, or to the Venturi Injector VTR-101 of the Ozonation System. Strainers SP-101A and SP-101B are installed on the suction line of P-101 A&B to protect the pumps from solid materials in the raw water. The Flow Transmitter FT-101 and the Temperature Transmitter TT-101 are installed on the discharge line of P-101A and P-101B. They serve to record the flow and temperature of raw water entering the pilot system and also to send a 4 to 20 mA output signal to a telemetry system for remote monitoring.

Instrumentation associated with the raw water pumps is summarized in Table 1.

TABLE 1

| Raw Water Pumps Instrumentation | | | |
|---|---|---|---|
| Tag No. | Function | Set point or range | Action |
| PI-101 A & B | Pressure Gauge | 0–15 psig | Indicates pumps discharge pressure |
| FT-101 | Flow Transmitter and Indicator | 0–.3–2 gpm | Indicate water flow; transmit 4–20 mA signal to telemetry system |
| TT-101 | Temperature Transmitter and Indicator | 35–80° F. | Indicate water temperature; transmit 4–20 mA signal to telemetry system |

FBT System

Figure 12:
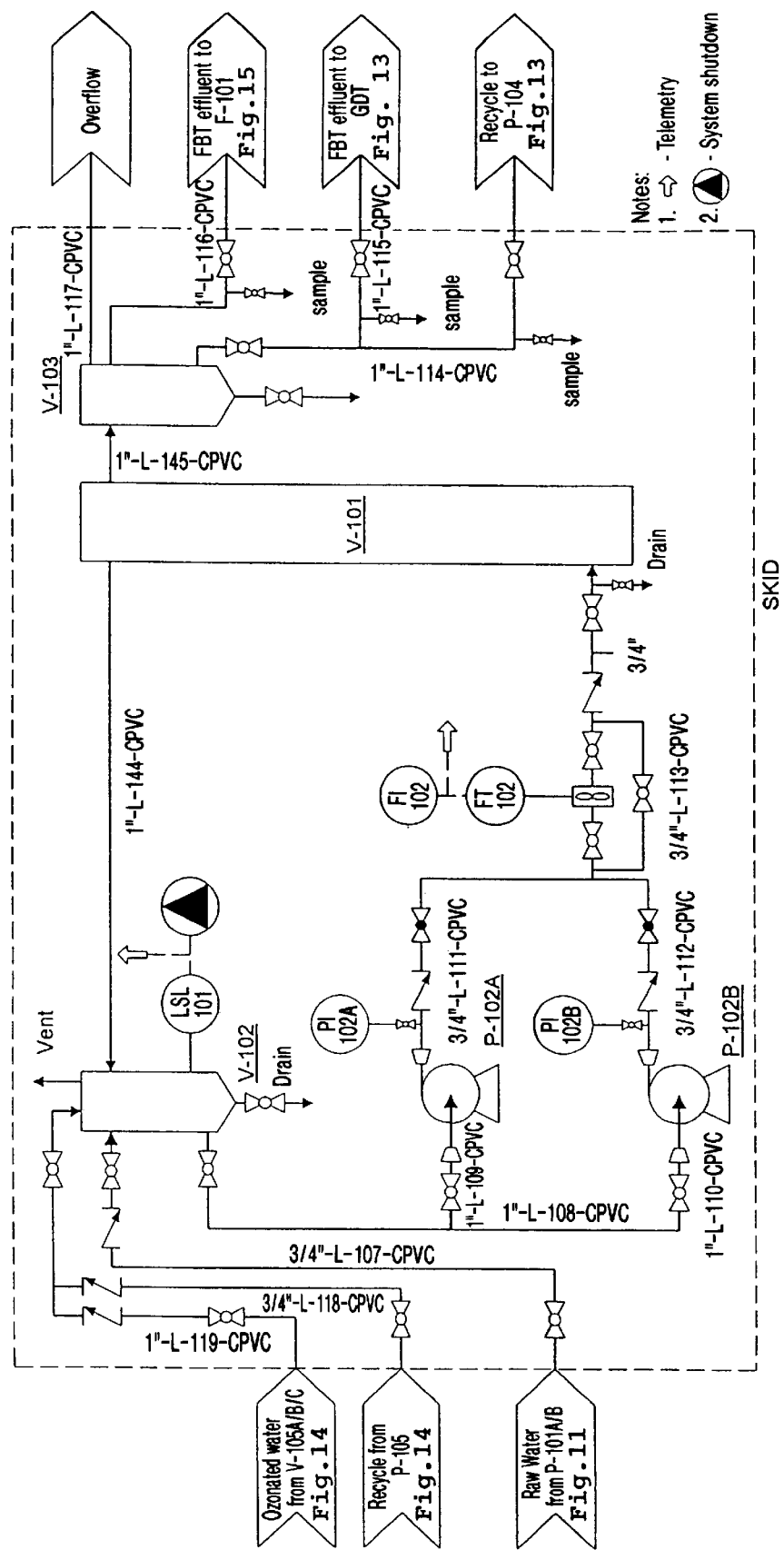

Referring to FIG. 12, (the second FBT system is identical). There are three flow streams that enter the FBT system, which depend on the mode of operation used (refer to Example 2 for the description of various modes of operation). These inlet flow streams are described in Table 2.

TABLE 2

| Inlet Streams to the FBT System | | |
|---|---|---|
| Stream | To | Mode (s) of Operation |
| Raw water | Pumps P-101 A & B (FIG. 11) | Single-pass FBT/ozonation or ozonation with recycle |
| Recycle flow | Pump P-105 (FIG. 14) | FBT/ozonation with recycle |
| Ozonated water | Reaction Tanks V-105 A/B/C (FIG. 14) | Ozonation/FBT or FBT/ozonation/FBT |

Depending on the mode of operation used, three flow streams exit the FBT system, which are described in Table 3.

TABLE 3

| Outlet Streams of the FBT System | | |
|---|---|---|
| Stream | To | Mode (s) of Operation |
| FBT effluent | Sand Filter F-101 (FIG. 13) | Single-pass FBT/ozonation or FBT/ozonation with recycle or FBT/ozonation/FBT |
| FBT effluent | Venturi Injector VTR-101 (FIG. 13) | Single-pass FBT/ozonation or FBT/ozonation with recycle |
| Recycle flow | Recycle pump F-104 (FIG. 13) | Ozonation/FBT with recycle |

The inlet streams enter the FBT Equalization Tank V-102 from where water is recirculated through the FBT Column V-101 by means of the Pump P-102A or P-102B. The FBT Equalization Tank V-102 is equipped with a vent at the top of the vessel in order to provide release of gas entering the vessel with the ozonated water from the Reaction Tanks V-105 A/B/C. The low level in V-102 is controlled by the Level Switch LSL-101, which activates an emergency shutdown procedure and prevents pumps P-102 A&B from running dry.

The flow to the FBT Column V-110 is maintained at a rate of 3 gpm, which is sufficient to fluidize the bed of support medium in V-101. The Flow Transmitter FT-102, installed on the discharge line of Pumps P-102 A&B, is used to monitor the flow rate both locally and remotely through the telemetry system.

An additional carbon source (CS) can be injected into the FBT column by means of the CS Injection Pump P-103 which pumps a solution of CS from the Storage Tank V-104 to the discharge line of P-102 A&B.

The effluent from V-101 flows through the FBT Effluent Tank V-103 to either the Sand Filter F-101 or the ozonation system, depending on the mode of operation used (refer to Table 3). In addition, the overflow line from V-103 to sewer is provided to prevent the tanks V-102 and V-103 and the FBT column V-101 from overflowing.

Instrumentation associated with the FBT system is summarized in Table 4.

TABLE 4

FBT System Instrumentation

| Tag No. | Function | Set point or range | Action |
| --- | --- | --- | --- |
| PI-101 A & B | Pressure Gauge | 0–15 psig | Indicates pumps discharge pressure |
| FT-101 | Flow Transmitter and Indicator | 3 gpm | Indicate water flow; transmit 4–20 mA signal to telemetry system |
| LSL-101 | Level Switch Low | 0'–6" | Activates low level shutdown and the autodialing system |

Ozonation System

Figure 13:
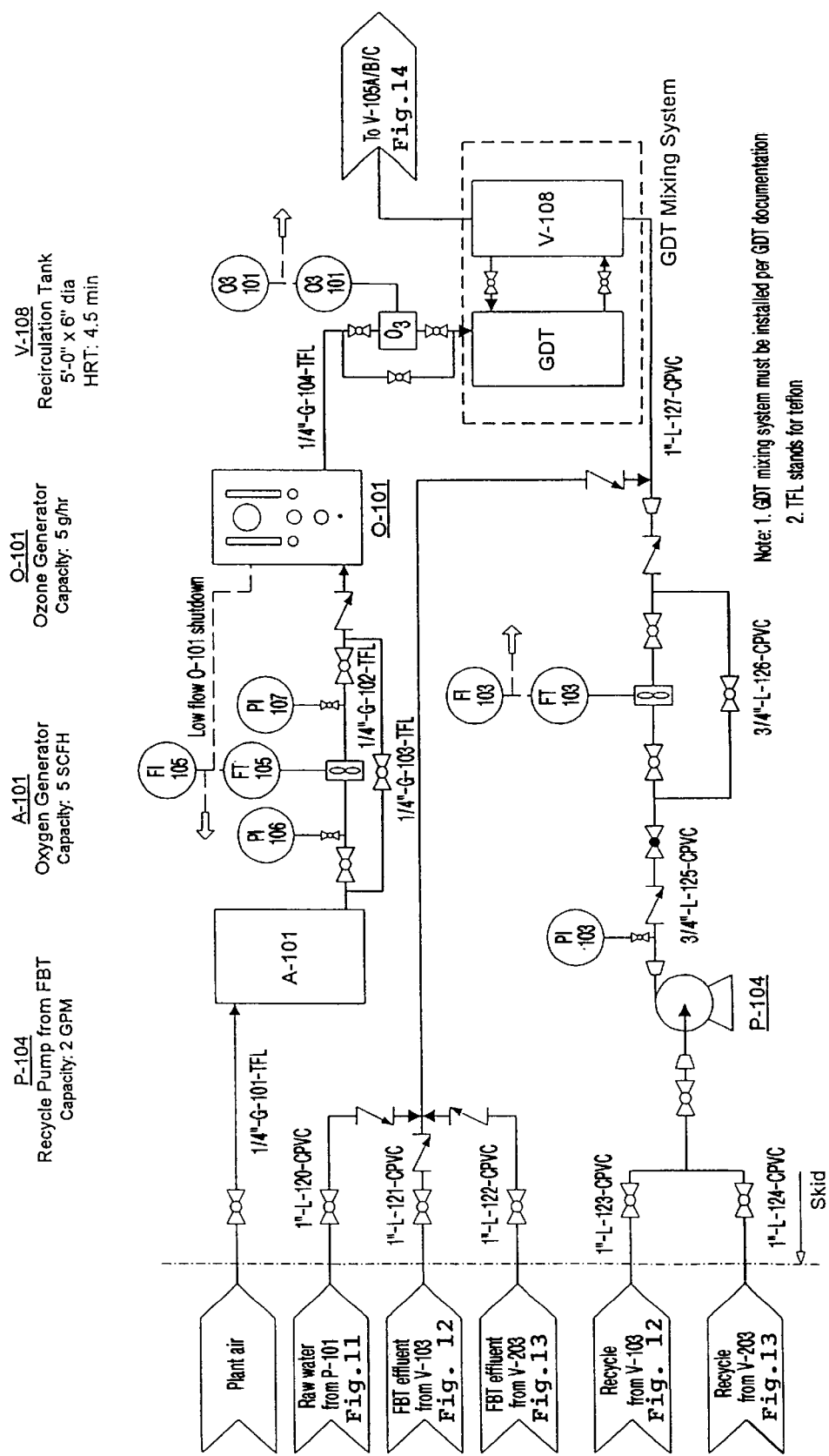
Figure 14:
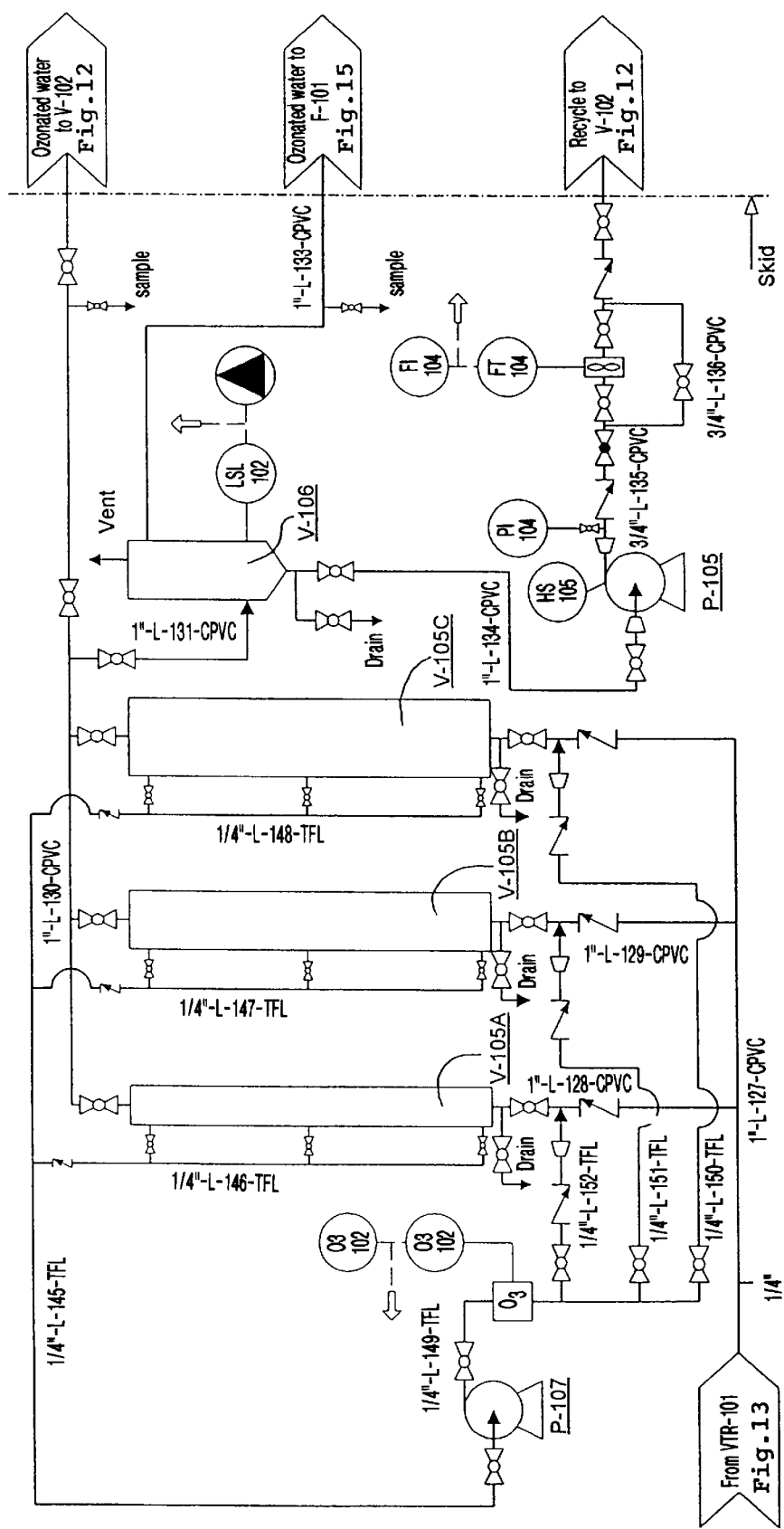

Referring to FIGS. 13 and 14 of the Ozonation System, the inlet flow streams to the ozonation system are described in Table 5.

TABLE 5

Inlet Streams to the Ozonation System

| Stream | From | Mode (s) of Operation |
| --- | --- | --- |
| Raw water | Pumps P-101 A & B (FIG. 14) | Single-pass ozonation/FBT or ozonation/FBT with recycle |
| FBT effluent | FBT Effluent Tank V-103 (FIG. 12) | Single-pass FBT/ozonation or FBT/ozonation with recycle or FBT/ozonation/FBT |
| FBT effluent | FBT Effluent Tank V-203 | Single-pass FBT/ozonation or FBT/ozonation with recycle or FBT/ozonation/FBT |
| Recycle flow | FBT Effluent Tank V-103 (FIG. 12) | Ozonation/FBT with recycle |
| Recycle flow | FBT Effluent Tank V-203 | ozonation/FBT with recycle |
| Air to ozone generator | Plant air | All modes |

The flow streams exiting the ozonation system are described in Table 6.

TABLE 6

Outlet Streams of the FBT System

| Stream | To | Mode (s) of Operation |
| --- | --- | --- |
| Ozonated water | Sand Filter F-101 (FIG. 15) | Single-pass ozonation/FBT or ozonation/FBT with recycle |
| Ozonated water | FBT Equalization Tank V-102 (FIG. 12) | Single-pass ozonation/FBT |
| Ozonated water | FBT Equalization Tank V-202 | Single-pass ozonation/FBT |
| Recycle flow | FBT Equalization Tank V-102 (FIG. 12) | FBT/ozonation with recycle |
| Recycle flow | FBT Equalization Tank V-202 | FBT/ozonation with recycle |

The inlet stream flows through the Venturi Injector VTR-101. The recycle stream from the FBT Effluent Tank V-103 or V-203 is pumped through the VTR101 by the Recycle Pump P-104. The Flow Transmitter FT-103 is installed on the discharge line of P-104 to monitor the recycle flow rate both locally and remotely through the telemetry system. The Venturi Injector VTR-101 provides mixing of gaseous ozone with water stream(s).

Ozone is produced by passing plant air through the Oxygen Generator A-101 and Ozone Generator O-101. The Oxygen Generator A-101 produces up to 95% pure oxygen from air by removing nitrogen using the Pressure Swing Adsorption (PSA) technology. The gas stream from A-101 flows to the Ozone Generator O-101 that produces ozone from oxygen. The Flow Transmitter FT-105 is installed upstream of O-101, which monitor gas flow rate both locally and remotely using the telemetry system. FT-105 also activates a low flow alarm and shutdown of O-101. The concentration of ozone in the gas from O-101 is monitored by the Ozone Analyzer O3-101.

The ozone-water mixture from VTR-101 flows through the Reaction Columns V-105A, V-105B, and/or V-105C. The Reaction Columns V-105A/B/C provide contact time for ozone to react with NOM in water. The reaction columns are columns of different diameter. Depending on which columns are employed, the contact time can vary from 5 to 35 minutes. Samples of water can be withdrawn at different height of the columns by means of the Sample Pump P-107 and analyzed for ozone using the Dissolved Ozone Analyzer O3-102.

Water from V-105 A/B/C flows either directly to V-102/V-202 of the FBT system (refer to Drawing M-002) (if single-pass ozonation/FBT or FBT/ozonation/FBT modes of operation is employed) or to the Equalization Tank V-106 (if single-pass FBT/ozonation or FBT/ozonation with recycle modes of operation is employed). The Equalization Tank V-106 is equipped with a vent at the top of the vessel in order to provide release of gas entering the vessel with the ozonated water from V-105 A/B/C.

Figure 15:
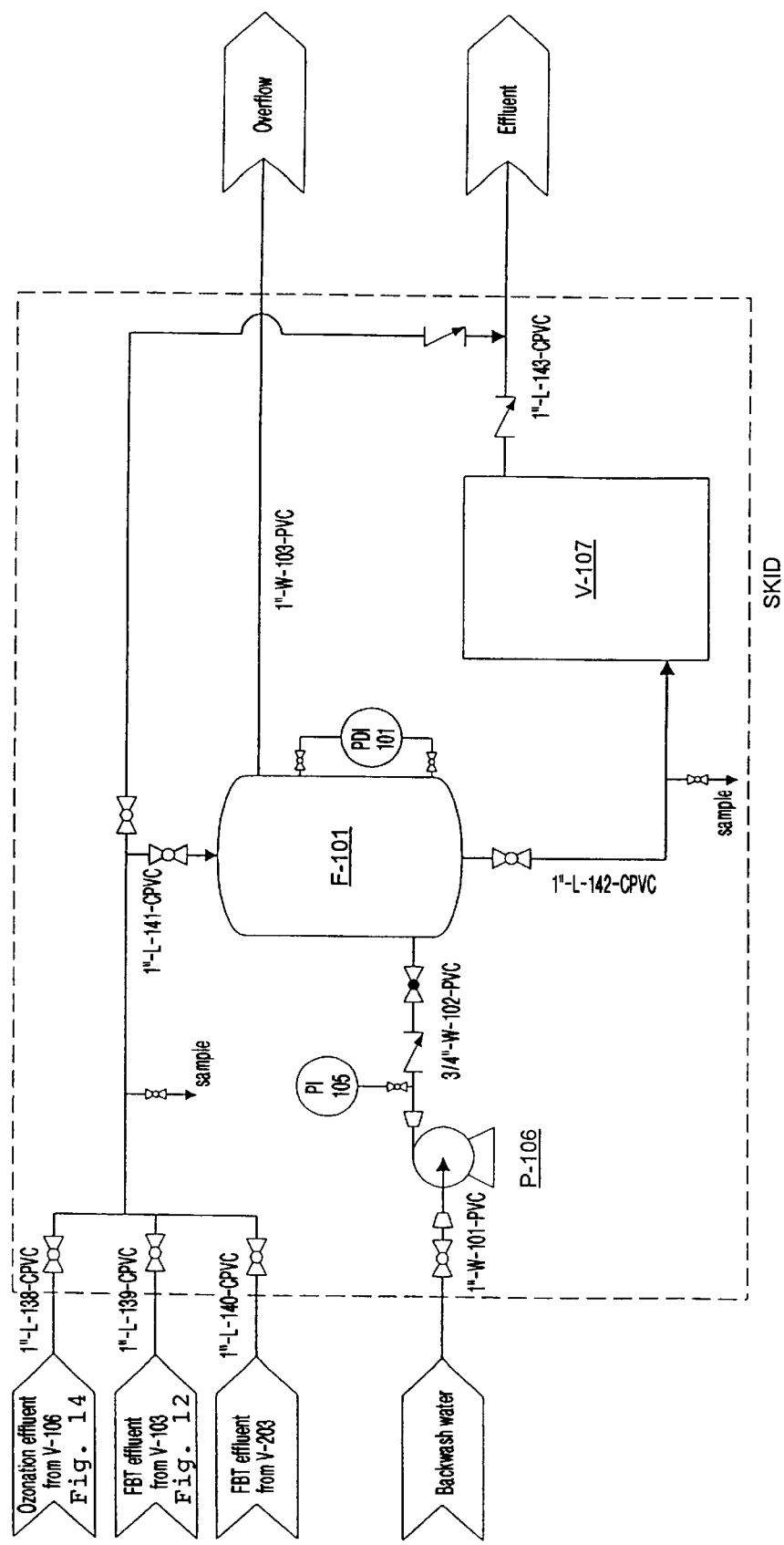

From V-106, water flows by gravity to the Sand Filter F-101 (FIG. 15). If a portion of ozonation effluent is to be recycled back to the FBT system, the Recycle Pump P-105 pumps water from the bottom of V-106 to the FBT Tank V-102 or V-202. In order to prevent P-105 from running dry, the Level Switch LSL-102 is installed on V-106, which activates an emergency shutdown procedure if water level in V-106 drops.

Instrumentation associated with the Ozonation system is summarized in Table 7.

TABLE 7

Ozonation System Instrumentation

| Tab No. | Function | Set point or range | Action |
|---|---|---|---|
| PI-103 and PI-104 | Pressure Gauge | 0–15 psig | Indicates pumps discharge pressure |
| PI-106 and PI-107 | Pressure Gauge | 0–30 psig | Indicates pressure across gas flow transmitter FT-105 |
| FT-103 and FT-104 | Flow Transmitter and Indicator | 0.5–2 gpm | Indicate water flow; transmit 4–20 mA signal to telemetry system |
| FT-105 | Flow Transmitter and Indicator | 0–5 sL/min | Indicate gas flow; transmit 4–20 mA signal to telemetry system; activates low flow alarm |
| 03-101 | Gaseous Ozone Analyzer | 0–60 mg $O_3$/L | Indicates concentration of ozone in gas phase; transmit 4–20 mA signal to the telemetry system |
| 03-102 | Dissolved Ozone Analyzer | 0–20 mg $O_3$/L | Indicates concentration of dissolved ozone; transmit 4–20 mA signal to the telemetry system |
| LSL-106 | Level Switch Low | 0'–6" | Activates low level shutdown and the autodialing system |

Sand Filtration System

Sand filtration is used as a final, polishing stage of the process for the removal of remaining turbidity and/or biodegradable organic materials. Depending on the mode of operation used, the effluent from the ozonation system or the FBT system flows by gravity through the Sand Filter F-101 filled with sand to the Effluent Tank V-107 and then to the sewer. The samples of treated water are taken from V-107 or from the discharge line downstream of V-107.

The Differential Pressure Gauge PDI-101 is installed on F-101 to monitor head losses across the bed. When pressure drop across the bed reaches a certain point, the bed is backwashed in order to remove solid materials accumulated at the top and/or inside the bed. This is accomplished by pumping water upward through the bed using the Backwash pump P-105. During the backwashing operation, the effluent from the ozonation or FBT systems is diverted straight to the sewer.

Instrumentation associated with the Sand Filtration system is summarized in Table 8.

TABLE 8

Sand Filtration System Instrumentation

| Tag No. | Function | Set point or range | Action |
|---|---|---|---|
| PI-105 | Pressure Gauge | 0–15 psig | Indicates pumps discharge pressure |
| PDI-101 | Differential Pressure Indicator | 0–30" Hg | Indicates pressure drop across the filter bed |

Parts list
P-101—Raw Water Pump; capacity: 1 GPM; Head: 40 ft; HP: 0.1.
V-101—FBT column—9'-0" diameter;
V-102—Equalization Tank—5'0"×6" diameter;
V-103—FBT Effluent Tank—5'0"×4" diameter;
P-102—FBR Pump—Capacity: 3 GPM
P-104—Recycle Pump from FBT—Capacity: 2 GPM;
A-101—Oxygen Generator—Capacity: 5 SCFH;
O-101—Ozone Generator—Capacity: 5 g/hr;
V-108—Recirculation Tank—5'0"×6" diameter; HRT: 4.5 min;
V-105A—Reaction Tank—5'0"×3" diameter;
V-105B—Reaction Tank—5'0"×4" diameter;
V-105C—Reaction Tank—5'0"×6" diameter;
V-106—Equalization Tank—5'-0"×4" diameter;
P-105—Recycle pump to FBT—Capacity: 2 GPM;
P-107—Sample Pump—Capacity: 500 mL/min;
F-101—Sand Filter;
V-107—Effluent Tank;
P-106—Backwashing pump—Capacity: 5 GPM.

The advantages of the process of the present invention over conventional combined ozonation/biotreatment process are:
1. Higher efficiency of the removal of disinfection by-products DBP formation potential, turbidity, and bacterial regrowth potential.
2. Lower ozone requirements.
3. No additional pretreatment is required.
4. Complete ozone utilization within the system.
5. Small footprint.
6. Higher flow through capacity.
7. Lower capital and Operating and maintenance costs.
8. The systems can be standard-size units.
9. The process performance of the unit is easily optimized for different sources of water supplies.
10. The system is capable to meet future effluent standards without plant expansion or process modification.
11. Flexible for future water needs.

It is important that in the fluidized bed of the present invention, the upper regions of the fluidized bed are deprived of carbon source because of utilization by the microorganisms near to the inlet of the bed. This carbon source deprivation enables the lower particles to more readily degrade the pollutants in the upper region. The fluidized particles migrate from the lower regions to the upper regions of the bioreactor due to an accumulation of microorganisms on the particles in the lower regions which increases the surface area in the fluid flow.

It is intended that the foregoing description be only illustrative of the present invention and that the present invention be limited only by the hereinafter appended claims.

We claim:

1. A process for the treatment of water to reduce amounts of pollutants in the water which comprises:
   (a) directing the water containing the pollutants, which pollutants are ozonated, through a microbiologically active fluidized bed of particles in a vessel with an inlet and an outlet for the water so that the bed is fluidized by the water and the pollutants are degraded by microorganisms in the bed;
   (b) providing a carbon source through the inlet to a lower region of the fluidized bed in the vessel as the water is moved through the fluidized bed in the vessel, without providing the carbon source to the upper region of the fluidized bed in the vessel, in an amount sufficient for the microorganisms in the lower region of the fluidized bed to grow biofilm layers around the particles in the lower region of the fluidized bed in the vessel which then migrate to the upper region of the fluidized bed wherein the microorganisms in the biofilm layer degrade the pollutants to produce an effluent;
   (c) removing the effluent from the outlet from the vessel; and
   (d) filtering the effluent from the vessel wherein the water with the reduced amounts of the pollutants is produced.

2. The process of claim 1 wherein the water is at a temperature between about 1 and 45° C. in the vessel.

3. The process of claim 1 wherein the carbon source is water soluble.

4. The process of claim 3 wherein the carbon source is selected from the group consisting of a lower alkyl acid, salts thereof and lower alkanols each containing 1 to 6 carbon atoms.

5. The process of claim 1 wherein the particles in the fluidized bed have a particle size between about 8 and 30 mesh.

6. The process of claim 1 wherein the particles are a water insoluble porous material.

7. The process of claim 6 wherein the material is activated carbon.

8. The process of claim 1 wherein the water contains between about 1 mg/liter and 50 mg/liter of pollutants which are organic compounds.

9. The process of claim 1 wherein the water with reduced amounts of pollutants produced in step (c) is to be treated to produce drinking water.

10. The process of claim 1 wherein a part of the effluent from the vessel is recycled for ozonation prior to introduction into the inlet into the vessel in step (a).

11. The process of claim 1 wherein a second vessel containing a second microbiologically active bed which is fluidized by the water is provided for a preliminary treatment of the water before step (a).

12. The process of claim 1 wherein the water is ozonated in a second vessel upstream of the vessel containing fluidized bed.

13. The process of claim 1 wherein the water is ozonated in a second vessel downstream of the vessel containing the fluidized bed, and wherein the ozonated water in the second vessel is recycled to the inlet of the vessel containing the fluidized bed.

14. The process of claim 1 wherein the ozonated water is provided from a second vessel connected to the vessel containing the fluidized bed.

15. The process of claim 1 wherein the ozonated water is provided by a second vessel connected to the outlet of the vessel containing the fluidized bed and partially recycled to the vessel containing the fluidized bed.

16. The process of claim 1 wherein there is a second vessel for ozonating the effluent from the vessel containing the fluidized bed and a third vessel for fluidized bed treatment of the ozonated effluent from the second vessel.

17. The process of claim 16 wherein a part of ozonated water from the second vessel is recycled to the vessel containing the fluidized bed.

18. The process of claim 1 wherein the fluidized bed is vertically oriented.

19. The process of claim 1 wherein the inlet to the vessel is at a bottom portion of the vessel below the fluidized bed.

20. A process for the treatment of water to reduce amounts of pollutants in the water which comprises:
   (a) directing the water containing the pollutants, which pollutants are ozonated, through a microbiologically active fluidized bed of particles in a first vessel with an inlet and an outlet for the water so that the bed is fluidized by the water and the pollutants are degraded by microorganisms in the bed;
   (b) directing the water from step (a) to a second vessel containing a second microbiologically active fluidized bed of particles wherein the second vessel has an inlet and an outlet for the water and the pollutants are degraded by the microorganisms in the bed;
   (c) providing a carbon source for the microorganisms in the fluidized bed in the second vessel as the water is moved through the fluidized bed in the second vessel, wherein the carbon source and pollutants are co-metabolized by the microorganisms and wherein an effluent is removed from the outlet from the second vessel; and
   (d) filtering the effluent from the second vessel wherein the water with the reduced amounts of the pollutants is produced.

21. A process for the treatment of water to reduce amounts of pollutants in the water which comprises:
   (a) directing the water containing the pollutants through a microbiologically active fluidized bed of particles in a first vessel with an inlet and an outlet for the water so that the bed is fluidized by the water and the pollutants are degraded by microorganisms in the bed;
   (b) providing a carbon source for the microorganisms in the fluidized bed in the first vessel as the water is moved through the fluidized bed in the first vessel, wherein the carbon source and pollutants are co-metabolized by the microorganisms and wherein an effluent is removed from the outlet from the first vessel;
   (c) directing the effluent from the first vessel to a second vessel downstream of the first vessel wherein the effluent in the second vessel is ozonated to produce an ozonated effluent which is recycled to the inlet of the first vessel; and
   (d) filtering the effluent from the first vessel wherein the water with the reduced amounts of the pollutants is produced.

22. A process for the treatment of water to reduce amounts of pollutants in the water which comprises:
   (a) directing the water containing the pollutants through a microbiologically active fluidized bed of particles in a first vessel with an inlet and an outlet for the water so that the bed is fluidized by the water and the pollutants are degraded by microorganisms in the bed;
   (b) providing a carbon source for the microorganisms in the fluidized bed in the first vessel as the water is moved through the fluidized bed in the first vessel, wherein the carbon source and pollutants are co-metabolized by the microorganisms and wherein an effluent is removed from the outlet from the first vessel;

(c) directing the effluent from the first vessel to a second vessel for the effluent wherein the effluent in the second vessel is ozonated to produce an ozonated effluent which is partially recycled to the inlet of the first vessel; and (d) filtering the ozonated effluent from the second vessel wherein the water with the reduced amounts of the pollutants is produced.

23. A process for the treatment of water to reduce amounts of pollutants in the water which comprises:

(a) directing the water containing the pollutants through a microbiologically active fluidized bed of particles in a first vessel with an inlet and an outlet for the water so that the bed is fluidized by the water and the pollutants are degraded by microorganisms in the bed;

(b) providing a carbon source for the microorganisms in the fluidized bed in the first vessel as the water is moved through the fluidized bed in the first vessel, wherein the carbon source and pollutants are co-metabolized by the microorganisms and wherein an effluent is removed from the outlet from the first vessel;

(c) directing the effluent from the first vessel to a second vessel with an inlet and outlet for the effluent wherein the second vessel ozonates the effluent from the first vessel to produce an ozonated effluent;

(d) directing the ozonated effluent from the second vessel to a third vessel with an inlet and an outlet for the ozonated effluent for fluidized bed treatment of the ozonated effluent as in step (a); and (e) filtering the effluent from the third vessel wherein the water with the reduced amounts of the pollutants is produced.

24. A process for the treatment of water to reduce amounts of pollutants in the water which comprises:

(a) directing the water containing the pollutants through a microbiologically active fluidized bed of particles in a first vessel with an inlet and an outlet for the water so that the bed is fluidized by the water and the pollutants are degraded by microorganisms in the bed;

(b) providing a carbon source for the microorganisms in the fluidized bed in the first vessel as the water is moved through the fluidized bed in the first vessel, wherein the carbon source and pollutants are co-metabolized by the microorganisms and wherein an effluent is removed from the outlet from the first vessel;

(c) directing the effluent from the first vessel to a second vessel with an inlet and an outlet for the effluent wherein the second vessel ozonates the effluent to produce an ozonated effluent after which (i) a part of the ozonated effluent from the second vessel is directed to a third vessel with an inlet and an outlet for the ozonated effluent from the second vessel for fluidized bed treatment of the ozonated effluent from the second vessel as in step (a), and (ii) a part of the ozonated effluent from the second vessel is recycled to the first vessel for fluidized bed treatement as in steps (a) and (b); and (d) filtering the effluent from the third vessel wherein the water with the reduced amounts of the pollutants is produced.

* * * * *

UNITED STATES PATENT AND TRADEMARK OFFICE
CERTIFICATE OF CORRECTION

PATENT NO.    : 6,365,048 B1                                                          Page 1 of 1
DATED         : April 2, 2002
INVENTOR(S)   : Susan Jane Masten and Alexander A. Yavich It is certified that error appears in the above-identified patent and that said Letters Patent is hereby corrected as shown below:

Column 1,
Line 45, "Mordoski" should be -- Mordorski --.

Column 3,
Line 43, "mater" should be -- matter --.
Line 48, "Mordoski" should be -- Mordorski --.

Column 7,
Line 11, "degas' separator" should be -- degas separator --.
Line 47, "for" after "be" and before "further" should be deleted.

Column 8,
Lines 5 and 6, "FBT/Ozonation Mode" should be as a heading for following paragraph.

Column 9,
Line 17, "th" should be -- the --.

Column 10,
Line 55, "pump F-104" should be -- P104 --.

Signed and Sealed this

Second Day of July, 2002

*Attest:*

*Attesting Officer*

JAMES E. ROGAN
*Director of the United States Patent and Trademark Office*